United States Patent
Matsunaga et al.

(10) Patent No.: US 7,602,803 B2
(45) Date of Patent: Oct. 13, 2009

(54) COMMUNICATION TIMING CONTROL METHOD AND APPARATUS, NODE, AND COMMUNICATION SYSTEM

(75) Inventors: Toshihiko Matsunaga, Osaka (JP); Masaaki Date, Osaka (JP); Yukihiro Morita, Saitama (JP); Shigeru Fukunaga, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1015 days.

(21) Appl. No.: 11/136,448

(22) Filed: May 25, 2005

(65) Prior Publication Data

US 2006/0034322 A1    Feb. 16, 2006

(30) Foreign Application Priority Data

May 27, 2004    (JP) .............................. 2004-157912

(51) Int. Cl.
*H04L 12/413*    (2006.01)
(52) U.S. Cl. .................. 370/447; 370/450; 370/337
(58) Field of Classification Search ................ 370/458, 370/461, 445, 337, 447, 448, 450, 507, 508, 370/509; 375/356–360
See application file for complete search history.

(56) References Cited

U.S. PATENT DOCUMENTS

| | | | | |
|---|---|---|---|---|
| 5,402,394 A | * | 3/1995 | Turski | .................. 368/10 |
| 5,926,101 A | * | 7/1999 | Dasgupta | ............... 340/825.02 |
| 6,765,863 B1 | * | 7/2004 | Wakimoto et al. | .......... 370/218 |
| 6,801,951 B1 | * | 10/2004 | Roden, III | ................... 709/248 |
| 7,388,886 B2 | * | 6/2008 | Perkins et al. | .............. 370/507 |
| 2002/0048337 A1 | * | 4/2002 | Ruuskanen | .................. 375/373 |
| 2004/0028086 A1 | * | 2/2004 | Ghiasi et al. | ................. 370/536 |

OTHER PUBLICATIONS

Waiyaresu LAN Akitekucha (Wireless LAN Architecture) edited by Matsushita et al., Kyoritsu Shuppan, 1996, pp. 48-71.

* cited by examiner

*Primary Examiner*—Ian N Moore
*Assistant Examiner*—Peter Cheng
(74) *Attorney, Agent, or Firm*—Venable LLP; Michael A. Sartori; Kyle D. Petaja

(57) ABSTRACT

Each node on a communication path receives state variable signals from other nodes indicating the internal operating states or internal timing of the other nodes, and transmits a state variable signal indicating its own internal operating state or timing. Transitions in the internal operating state or timing of a node take place at a basic transition rate but at times adjusted according to the state variable signals received from other nodes. The basic transition rate varies according to position on the communication path. The nodes can thereby establish transmitting time slots that follow each other in progression on the communication path, enabling data signals to be relayed from the starting node to the destination node with minimal delay at each intermediate node.

14 Claims, 4 Drawing Sheets

COMMUNICATION TIMING CONTROL METHOD AND APPARATUS, NODE, AND COMMUNICATION SYSTEM

BACKGROUND OF THE INVENTION

1. Field of the Invention

The present invention relates to a communication timing control method, a communication timing control apparatus, a node, and a communication system, more particularly to a method of avoiding data transmission collisions and reducing delays in multi-hop communication.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, *Waiyaresu LAN Akitekucha* (Wireless LAN Architecture), edited by Matsushita and Nakagawa, Kyoritsu Shuppan, 1996, pp. 47, 53-59, and 69 (in Japanese).

In the CSMA methods, a node with data to transmit determines whether other nodes are transmitting by sensing their carrier signals, and waits until no other node is transmitting before transmitting itself. The CSMA methods have the disadvantage of severely restricting the number of channels that can be used simultaneously.

In the TDMA method, different time slots are assigned to different nodes, and each node transmits data in its own assigned time slot. TDMA can provide more simultaneous communication channels than CSMA, but when the set of communicating nodes changes dynamically, an administrative node must reassign the time slots dynamically. A weakness of the TDMA system is that if the administrative node malfunctions, the entire communication system may be brought down. The process by which time slots are assigned dynamically to nodes is also complex, making it difficult to respond promptly to changing conditions. A further problem is that the width of the time slots cannot be changed.

Another problem with TDMA is that each node must await its time slot before it can transmit. In multi-hop communication, accordingly, a delay occurs at each node on the communication path. As the number of hops increases, the total delay can become objectionably large.

It would be desirable to have a more flexible method and apparatus for controlling communication timing, so that each node could communicate effectively without having to receive timing control instructions from an administrative node. It would also be desirable to reduce the delay in multi-hop communication.

SUMMARY OF THE INVENTION

An object of the present invention is to provide a communication timing control method that avoids signal collisions in a communication system by autonomous control of the communicating nodes.

Another object of the invention is to enable the nodes to adjust flexibly and autonomously to changing conditions in the communication system.

Still another object is to minimize delays in multi-hop communication.

In the invented communication timing control method, each node in the communication system receives, from at least one other node in the communication system, input state variable signals indicating an operating state or operating timing of the other node. The node generates transitions in its internal operating state or operating timing at a basic transition rate but at times adjusted according to the input state variable signals received from the other nodes, generates an output state variable signal according to these transitions, and transmits the output state variable signal to the other nodes.

When a communication path is set up, each transmitting node on the communication path sets hopcount information specifying its position on the communication path, and determines its basic transition rate from the hopcount information. The basic transition rate may decrease with increasing numbers of hops from the starting node, or the path may be divided into segments and the basic transition rate in each segment may decrease with increasing numbers of hops from the last node in the preceding segment.

By adjusting their internal transition timings, the nodes on the communication path autonomously reach a steady state in which the state variable signals transmitted from different nodes are separated by intervals that can be used as time slots for data communication, and the time slots follow one another in order from the starting node to the destination node on the communication path. Accordingly, when data signals are relayed from the starting node to the destination node, minimal delay occurs at each intermediate node.

The invention also provides a communication timing control apparatus employing the invented method, and a communication system with a plurality of nodes, each including the invented communication timing control apparatus

DETAILED DESCRIPTION OF THE INVENTION

Figure 1:
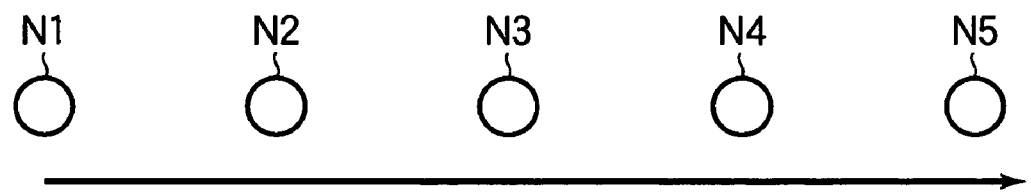
FIG. 1 shows an arrangement of nodes in a first embodiment of the invention.

Embodiments of the invention will now be described with reference to the attached drawings, in which like elements are indicated by like reference characters.

Referring to FIG. 1, the communication system in the following embodiments is a network comprising a plurality of nodes, including nodes disposed in, for example, a substantially linear arrangement conducive to multi-hop communication. In the description below, it will be assumed that the communication system includes five such nodes N1-N5.

FIRST EMBODIMENT

Figure 2:
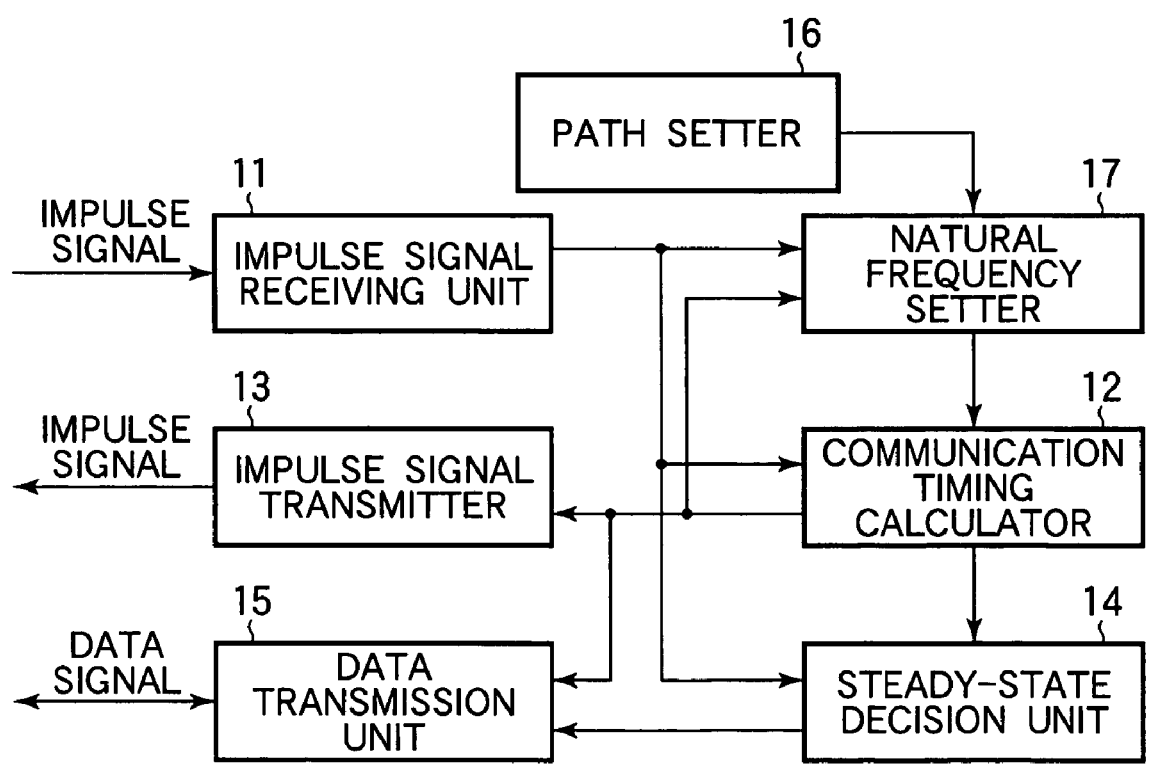
FIG. 2 is a functional block diagram showing the internal structure of a node in the first embodiment.

Referring to FIG. 2, each node in the first embodiment comprises an impulse signal receiving unit 11, a communication timing calculator 12, an impulse signal transmitter 13, a steady-state decision unit 14, a data transmission unit 15, a path setter 16, and a natural frequency setter 17. The impulse signal receiving unit 11, communication timing calculator 12, impulse signal transmitter 13, steady-state decision unit 14, path setter 16, and natural frequency setter 17 combine to function as a communication timing control apparatus.

The path setter 16 stores information specifying a communication path and the position of its own node on the path. The position is specified as a hopcount (x) from the starting node on the path. For the path from node N1 to node N5 in FIG. 1, the path setter 16 at node N1 specifies a hopcount of zero (x=0). The path setters 16 at nodes N2, N3, and N4 specify hopcounts of one (x=1), two (x=2), and three (x=3), respectively. The hopcount is supplied to the natural frequency setter 17.

The natural frequency setter 17 at the i-th node Ni sets a natural angular frequency $\omega_i$ representing the node's basic rhythm of operation. The natural angular frequency $\omega_i$ has a value of $\omega - x \cdot \alpha$, where $\alpha$ and $\omega$ are fixed parameters and x is the hopcount specified by the path setter 16. In FIG. 1, the natural angular frequency parameters $\omega_1$, $\omega_2$, $\omega_3$, $\omega_4$ set at node N1, N2, N3, N4 have the following values:

$\omega_1 = \omega$ $\omega_2 = \omega - \alpha$ $\omega_3 = \omega - 2\alpha$ $\omega_4 = \omega - 3\alpha$ The natural angular frequency value $\omega_i$ is supplied to the communication timing calculator 12.

The impulse signal receiving unit 11 receives impulse signals transmitted by neighboring nodes. An impulse signal is a timing signal, not including any data or destination address. The impulse signal may have, for example, a Gaussian waveshape. The impulse signal receiving unit 11 sends each received impulse signal, or a reshaped version of the impulse signal, or a signal generated from the received impulse signal, to the communication timing calculator 12 and steady-state decision unit 14.

The communication timing calculator 12 at the i-th node generates a phase signal $\theta_i(t)$ with a value that is advanced by the amount given in equation (1) below at successive times t. This equation models a type of nonlinear oscillation. The invention is not limited to the use of this particular model; other equations that model nonlinear oscillation may be used instead. The phase value may be regarded as a state variable of the node, and the phase signal $\theta_i(t)$ as a state variable signal.

$$\frac{d\theta_i(t)}{dt} = \omega_i + \sum_{k=1}^{N} P_k(t) \cdot R(\theta_i(t), \sigma(t)) \quad (1)$$

$$R(\theta_i(t), \sigma(t)) = \sin(\theta_i(t) + \sigma(t)) \quad (2)$$

$$\sigma(t) = \pi + \phi(t)$$

$\theta_i(t)$: phase signal of node i
$\omega_i$: natural angular frequency parameter of node i
$P_k(t)$: received impulse signal received from node k
$R(\theta_i(t), \sigma(t))$: phase response function
$\phi(t)$: random noise function Equation (1) is essentially a rule for generating variations in the basic rhythm of operation of the i-th node in response to the signals furnished from the impulse signal receiving unit 11. The function $P_k(t)$ expresses the value at time t of the output from the impulse signal receiving unit 11 for the received impulse signal received from neighboring node k (k=1 to N). N is the total number of nodes on the communication path that interact with the i-th node by transmitting and receiving impulse signals. The interacting nodes may include all nodes on the communication path, or all nodes except the destination node, which does not transmit, or all nodes on a segment of the transmitting path. The function $R(\theta_i(t), \sigma(t))$ is a phase response function that determines how the basic period or rhythm is varied in response to the received impulse signals, and may be defined as in, for example, equation (2), which adds random noise in complementary phase to the phase value $\theta_i(t)$.

Equations (1) and (2) have a nonlinear operating characteristic that acts as a repulsion rule by attempting to move the timing phase of each node away from the timing phases of the neighboring nodes with which it interacts. More specifically, if two neighboring nodes are operating in phase with each other, for example, so that they have the same transmission timing and their transmissions collide, equations (1) and (2) operate so as to move the nodes away from this timing relationship, so that they operate with an appropriate phase difference.

The constant term $\pi$ in equation (2) attempts to establish a complementary phase relationship between neighboring nodes. The random noise function $\phi(t)$ gives the nonlinear characteristic a random variability by generating noise (random values) according to, for example, a Gaussian probability distribution with a mean value of zero. The random variability is added to keep the system from becoming trapped in a locally stable state (local solution) other than the desired stable state (optimal solution).

The phase response function $R(\theta_i(t), \sigma(t))$ in equation (2) above is a sine function, but the invention is not limited to the use of a sine function, and the constant term is not limited to $\pi$. The constant term may be any constant $\lambda$ other than zero or an even multiple of $\pi$ (e.g., any value in the range $0 < \lambda < 2\pi$. If a constant other than $\pi$ is used, the result will be that neighboring nodes attempt to assume different but not reverse phases.

The above computational operations will be explained in further detail with reference to drawings that show how the phases of a plurality of nodes are forced apart over time.

Figure 3A:
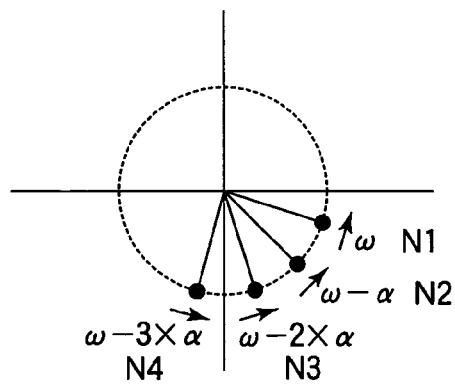
FIG. 3A illustrates an early state during communication among four nodes in the first embodiment.
Figure 3B:
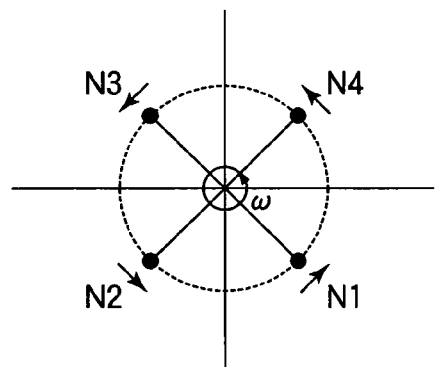
FIG. 3B illustrates the steady state during communication among the four nodes in the first embodiment.

FIGS. 3A and 3B illustrate this process when the interacting nodes are nodes N1 to N4. FIG. 3A shows the state shortly after the start of interaction. Nonlinear oscillation is modeled by the motion of four point masses rotating around a circle, expressing the timing phase of nodes N1 to N4. If the rotational motion of a point mass is projected onto the vertical axis or horizontal axis, the motion of the projected point exhibits harmonic nonlinear oscillation. From equation (1), a nonlinear characteristic operating on the four mass points attempts to bring them into complementary phases, so with elapse of time, the state in FIG. 3A evolves to the steady state shown in FIG. 3B in which the four point masses are substantially $\pi/2$ radians out of phase with each other.

The four point masses originally rotate at the different angular rates given by the natural angular frequency parameters of the nodes ($\omega$, $\omega-\alpha$, $\omega-2\alpha$, $\omega-3\alpha$). As the point masses interact by transmission and reception of impulse signals, however, their rates of rotation become equal and the steady state shown in FIG. 3B is maintained. The equalizing process can be understood as operating by mutual repulsion of the four point masses as they rotate (for simplicity, the equal rotation rate in FIG. 3B is indicated to be ω). In the steady state, if each node transmits at a predetermined phase β (for example, β=0), the transmission timings will be spaced at equal intervals.

The communication timing calculator 12 outputs the phase signal $\theta_i(t)$ that it generates to the impulse signal transmitter 13, steady-state decision unit 14, and data communication unit 15.

The impulse signal transmitter 13 transmits the output impulse signal according to the phase signal $\theta_i(t)$. That is, it transmits the output impulse signal when the phase signal $\theta_i(t)$ takes on a specific value β ($0 \leq \beta < 2\pi$). It is desirable for a particular value of β to be uniformly set for the entire system. No generality is lost by assuming that β=0, so in the following description it will be assumed that β=0 uniformly throughout the system. In the example shown in FIGS. 3A and 3B, since there is a phase difference of π/2 between the phase signals $\theta_i(t)$ in the steady state, even if the uniformly set phase value β=0 is used throughout the system, there will be a phase difference of π/2 between the transmitting timing of impulse signals from nodes N1 to N4.

The steady-state decision unit 14 decides whether the transmission timings of the output impulse signals at its own node and neighboring nodes are in a transitional state (as in FIG. 3A) or the steady state (as in FIG. 3B). The steady-state decision unit 14 observes the timing of the received impulse signals (corresponding to the output impulse signal of the other node) and the timing of the output impulse signals from its own node, and decides that they are in the steady state if the timing differences remain constant, or nearly constant, over time. The steady-state decision unit 14 receives the phase signal $\theta_i(t)$ as a signal for acquiring the transmitting timing of the impulse signal from its own node.

The steady-state decision unit 14 can make the steady-state decision, for example, as follows.

(a) The value γ of the phase signal $\theta_i(t)$ at the timing of generation of the received impulse signal from the impulse signal receiving unit 11 is observed for one period of the phase signal $\theta_i(t)$. Let the observed values γ of the phase signals $\theta_i(t)$ be:

$$\gamma_1, \gamma_2, \ldots, \gamma_N \; (0 < \gamma_1 < \gamma_2 < \ldots < \gamma_N < 2\pi)$$

(b) The differences (phase differences) Δ between adjacent values are calculated from the observed values γ of the phase signals $\theta_i(t)$.

$$\Delta_1 = \gamma_1, \Delta_2 = \gamma_2 - \gamma_1, \ldots, \Delta_N = \gamma_N - \gamma_{N-1}$$

(c) Processes (a) and (b) above are carried out at intervals of one period of the phase signal $\theta_i(t)$ and the rate of change δ (differences) in the phase difference Δ between adjacent periods is calculated.

$$\delta_1 = \Delta_1(\tau+1) - \Delta_1(\tau), \delta_2 = \Delta_2(\tau+1) - \Delta_2(\tau), \ldots, \delta_n = \Delta_N(\tau+1) - \Delta_N(\tau)$$

where τ indicates discrete time in units of one period of the phase signal $\theta_i(t)$.

(d) The steady state is recognized when the above rates of change δ are all smaller than a predetermined value ε.

$$\delta_1 < \epsilon, \delta_2 < \epsilon, \ldots, \delta_N < \epsilon$$

It is also possible, however, to make the steady state decision according to whether the decision condition $$\delta_1 < \epsilon, \delta_2 < \epsilon, \ldots, \delta_N < \epsilon$$

is satisfied over M periods (where M is an integer greater than two). The larger the value of M is, the more stable the state must be in order for the steady-state decision unit 14 to decide that the steady state has been reached. Alternatively, the decision may be based on only some of the received impulse signals.

At intervals equal to the period of the phase signal $\theta_i(t)$, the steady-state decision unit 14 sends the data communication unit 15 a steady-state decision signal indicating the decision result, and a slot signal equal to the minimum value $\gamma_1$ of the value γ of the phase signal $\theta_i(t)$.

The data communication unit 15 receives data transmitted by other nodes and transmits data originating at or relayed by its own node. When the steady-state decision signal indicates that the steady state has been recognized, the data communication unit 15 transmits data in a time slot as described below. (The term 'time slot' will be used even though it does not indicate a fixed time interval allocated by the system.) When the steady-state decision signal indicates a transitional state, the data communication unit 15 does not transmit data.

A time slot is a time interval during which $\theta_i(t)$ satisfies the following condition:

$$\zeta_1 < \theta_i(t) < \gamma_1 - \zeta_2$$

The time slot starts at a timing following the transmission of the output impulse signal (the phase signal value at this point is assumed to be $\zeta_1$), and ends at a time $\gamma_1 - \zeta_2$ preceding the generation of the closest received impulse signal, offset by an amount $\zeta_2$ from the timing $\gamma_1$ of that received impulse signal. The parameters $\zeta_1$ and $\zeta_2$ are phase widths representing very short spaces of time that assure that impulse signals transmitted from the transmitting node or another neighboring node and data signals transmitted from the transmitting node or another neighboring node are not both present in the space near the transmitting node at the same time.

In the steady state shown in FIG. 3B, for example, node N1 starts the transmission of an impulse signal at phase zero ($\theta_i(t)=0$), ends transmission of the impulse signal before phase $\zeta_1$, starts transmission of the data signal at phase $\zeta_1$ ($\theta_i(t)=\zeta_1$), ends transmission of the data signal at phase $\gamma_1 - \zeta_2$ ($\gamma_1 = \pi/2$), and does not transmit further impulse signals or data signals until the phase returns to zero. Node N2 carries out the same operations but defines phase according to $\theta_2(t)$; the phase difference of π/2 between $\theta_1(t)$ and $\theta_2(t)$ prevents the transmitted data and impulse signals from colliding. Nodes N3 and N4 transmit data and impulse signals in the same way using $\theta_3(t)$ and $\theta_4(t)$, so none of the transmitted data and impulse signals collide.

Data signals may be transmitted at lower power than impulse signals, since they only have to reach the next node on the communication path.

Next, the operation of the communication system in the first embodiment will be described. The description will cover (1) communication path setting, (2) setting of initial interaction state, (3) interaction, and (4) initiation of data transmission.

(1) Communication Path Setting

The path setter 16 in each of the nodes N1, N2, N3, N4 that transmit data on the communication path from node N1 to node N5 sets information describing the communication path. The communication path information may be obtained from an administrative node, or the communication path may be set up by the participating nodes themselves, by any of various known methods. The communication path may be set up anew for each transmission.

In the description below, it will be assumed that the specified communication path is routed from N1 through nodes N2, N3, and N4 in this sequence to node N5, as shown in FIG. 1. When the route (communication path) is determined, the path setter 16 holds information (x) giving the position of its own node in the sequence of nodes on the route by specifying the number of hops from the starting node.

(2) Setting of Initial Interaction State

After the communication path is set up, the natural frequency setter 17 determines and then sets the initial angular velocity parameter (natural angular frequency parameter) of its own node by using the node sequence information held in the path setter 16 as described above. The natural angular frequency parameter of the starting node N1 is set to the value ($\omega$) predetermined by the network. The initial angular velocity parameter of the next node N2 is set to $\omega-\alpha$, where $\alpha$ is a specific small positive value defined by the network, smaller than the value obtained by dividing one cycle ($2\pi$) by the number of the nodes. Similar settings of $\omega-2\alpha$ and $\omega-3\alpha$ are made at nodes N3 and N4. The natural angular frequency parameters decrease from the starting node N1 to the last transmitting node (N4), which transmits to the destination node (N5).

(3) Interaction

Node N1 transmits an impulse signal to the other nodes N2 to N4. Upon reception of the impulse signal, nodes N2 to N4 start transmitting impulse signals of their own, interacting with each other according to equation (1). FIG. 3A above shows the phase relationships among nodes N1 to N4 shortly after the interaction starts. The phases of nodes N2, N3, and N4 follow the phase of node N1 in this sequence according to the differences in their initial angular velocities.

(4) Initiation of Data Transmission

When the steady state is reached, the phase relationships among the nodes are as shown in FIG. 3B. Nodes N1, N2, N3, and N4 continue to transmit impulse signals when their phase signal $\theta$ is 0.

Figure 4:
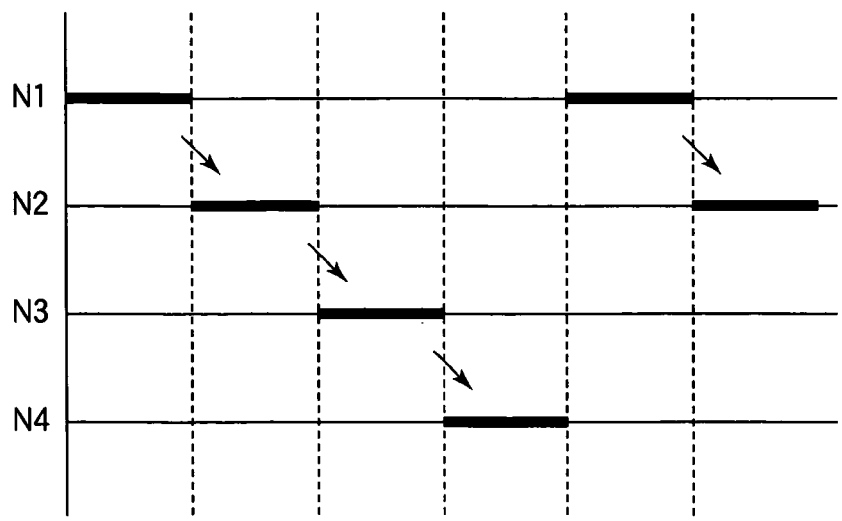
FIG. 4 illustrates the assignment of time slots to nodes in the first embodiment.

FIG. 4 is a time sequence diagram showing the allocation of time slots in which data signals can be transmitted. The time slots of each node are indicated by bold lines. The nodes transmit data signals in the same sequence (N1, N2, N3, N4) in which they transmit impulse signals. Data signals are therefore relayed from node N1 to node N5 with minimal delay on the communication path. For example, data transmitted from node N1 to node N2 in one time slot are relayed promptly to node N3 in the next time slot.

In the description above, no time slot is allocated to the destination node N5, an arrangement suitable for unidirectional communication. For bidirectional communication, node N5 may also participate in the interaction and receive time slots, as will be described later.

The first embodiment lets each node allocate its own time slots by interaction with its neighboring nodes. The individual nodes adjust their own time slots interactively and autonomously. In addition, the time slots are allocated in the same order as the order in which data signals are relayed through the nodes, enabling data communication to proceed with minimal delay.

SECOND EMBODIMENT

Next a second embodiment of the communication timing control apparatus, communication timing control method, and node and communication system of the present invention will be described.

The second embodiment assumes that the starting node and the end node (either the destination node or the node one hop before the destination node) are out of range of each other's impulse signals and do not interact. For example, if the impulse signal range is 2R in FIG. 5, then only nodes N2 and N3 are within impulse signaling range of node N1; nodes N4 and N5 are out of impulse signaling range of node N1 but are both are within impulse signaling range of node N3.

Figure 6:
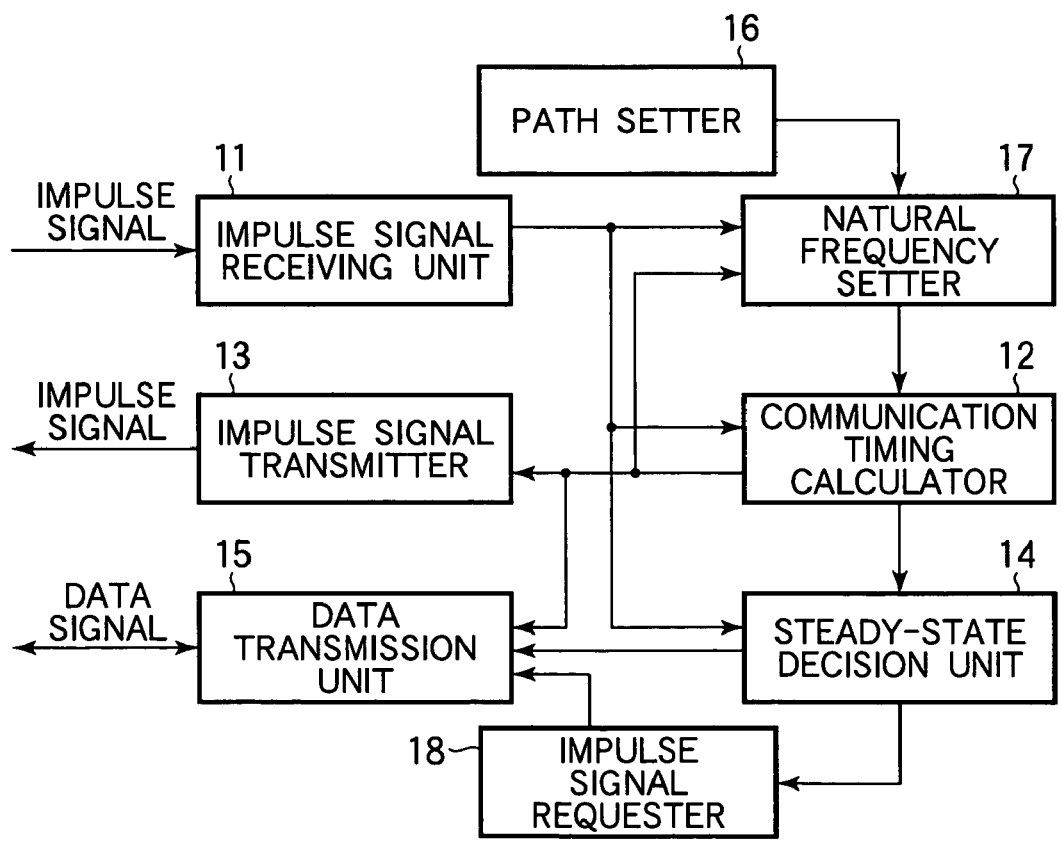
FIG. 6 is a functional block diagram showing the internal structure of a node in the second embodiment.

Referring to FIG. 6, each node in the second embodiment comprises an impulse signal receiving unit 11, a communication timing calculator 12, an impulse signal transmitter 13, a steady-state decision unit 14, a data communication unit 15, a path setter 16, and a natural frequency setter 17, as in the first embodiment, and an additional impulse signal requester 18.

In this embodiment, the communication path information set by the path setter 16 includes information dividing the data communication path into segments. The first segment consists of the starting node N1 and the nodes N2, N3 within impulse signaling range of the starting node N1. For the path in FIG. 5 there is only one other segment, consisting of the remaining nodes N4, N5.

At nodes in the first segment, the natural frequency setter 17 sets the natural angular frequency parameter as described in the first embodiment, according to the number of hops from the starting node. In other segments, the natural frequency setter 17 sets the natural angular frequency parameter according to the number of hops from a node in the preceding segment, such as the last node in the preceding segment.

The impulse signal requester 18 generates an interaction start request signal when the steady-state decision unit 14 detects the steady state. The interaction start request signal is sent in a data signal addressed to nodes in the next segment on the communication path. The impulse signal requester 18 may operate in all of the nodes, or only in some nodes, such as the last node in each segment except the last segment.

Next the operation of the communication system in the second embodiment will be described, focusing on the differences from the first embodiment.

In the second embodiment, since not all nodes can interact with each other, the interaction range is initially limited to the nodes in the first segment, which can interact with the starting node. These nodes can also interact with each other. The following sequence of operations is carried out: (1) initial interaction limited to nodes in the first segment; (2) interaction with successively more distant segments; and (3) initiation of data signal transmission when all segments have interacted and a final steady state has been reached.

(1) Initial Interaction

Figure 5:
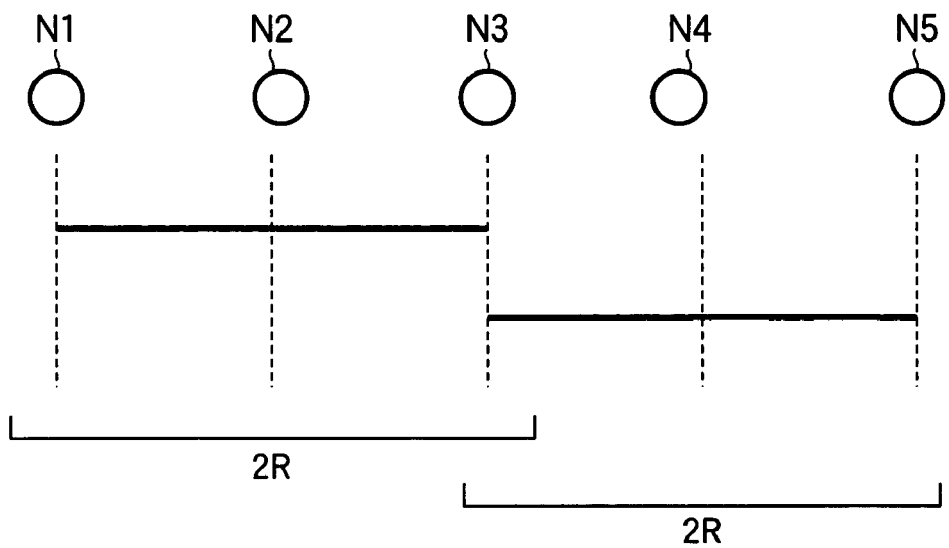
FIG. 5 illustrates impulse signal communication ranges on a segmented communication path in a second embodiment of the invention.

Referring to FIG. 5, the starting node begins the interaction process by transmitting an impulse signal. Nodes N2 and N3 receive the impulse signal and begin transmitting impulse signals of their own. Nodes N1 to N3 now interact as described in the first embodiment.

When the steady state is reached, nodes N1, N2, and N3 are transmitting impulse signals in a cyclic sequence. One of these nodes N1 to N3 which has already started transmitting impulse signals now sends an interaction start request signal in a data signal addressed to the remaining nodes N4 and N5. The sending node may be restricted to node N3. More generally, a node may be allowed to send an interaction start request signal only if it is adjacent to a node that has not yet begun transmitting impulse signals.

If the path setter 16 in nodes N4 and N5 has not been able to set sequence information specifying the positions of these nodes on the communication path relative to the starting node, the interaction start request signal may include such information.

(2) Interaction with Further Nodes

On reception of the interaction start request signal, nodes N4 and N5 begin transmitting impulse signals and interacting with each other and with other nodes. More specifically, when nodes N4 and N5 receive the interaction start request signal, their data transmission units 15 direct their communication timing calculators 12 to calculating phase signals as described in the first embodiment.

Node N4 starts interaction at an initial angular velocity of ω−α; node N5 starts interaction at an initial angular velocity of ω−2α. These initial angular velocities, ω−α and ω−2α, are determined by the hop counts from node N3, the last node in the initial interaction segment. The coefficient of α for node N4 is one because node N4 is one hop from node N3; the coefficient of α for node N5 is two because node N5 is two hops from node N3.

(3) Initiation of Data Signal Transmission

Each of nodes N1-N5 continues to interact with the other nodes from which it receives impulse signals. In this stage node N2, for example, interacts with nodes N1, N3, and N4; node N3 interacts with nodes N1, N2, N4, and N5; node N4 interacts with nodes N2, N3, and N5.

Although nodes N1 to N3 had already reached a steady state during their initial interaction, when further nodes (N4 and N5 in this case) are added to the interaction, another transitional state may ensue, after which a new steady state is established with a different phase relationship.

Figure 7A:
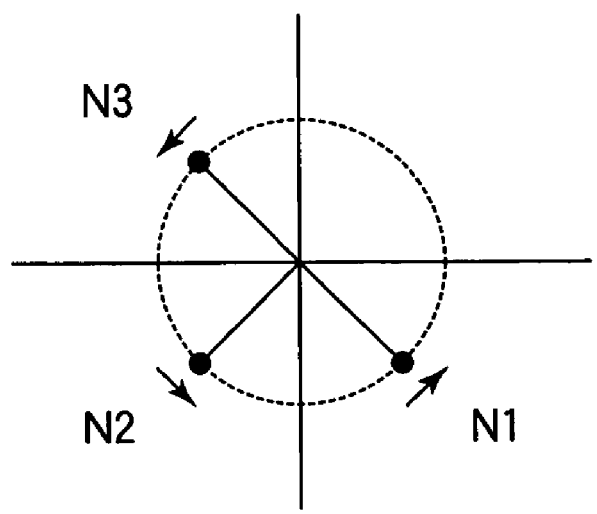
FIG. 7A illustrates communication timing relationships among three nodes in the second embodiment.
Figure 7B:
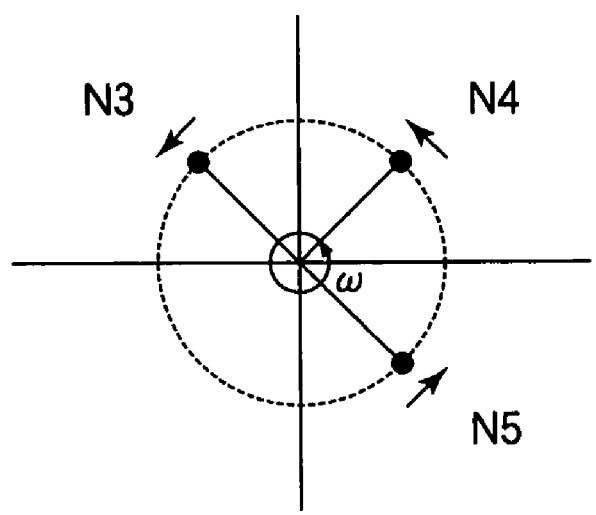
FIG. 7B illustrates communication timing relationships among further nodes in the second embodiment.

FIG. 7A shows the phase relationship established among nodes N1 to N3; FIG. 7B shows the phase relationship established among nodes N3 to N5. From FIGS. 7A and 7B it is apparent that, as in the first embodiment, the nodes generate and transmit impulse signals in a sequence that proceeds in order from one node to the next node on the communication path. Once this steady state is reached, data signals are transmitted in time slots related as shown in FIG. 4, with minimal delay at each node.

The second embodiment produces the same effect as the first embodiment even when the nodes on the communication path cannot all interact with each other directly. Time slots are assigned to the nodes in a sequence matching the sequence by which data signals are relayed among the nodes, resulting in data communication with minimum delay.

Variations

In the embodiments described above, only unidirectional communication was described, but the present invention is applicable to bidirectional communication as well. In the bidirectional case, the nodes may determine separate time slots for each communication direction by using the methods described above, but it is also possible to use the methods described above to select time slots for communication in one direction and to have each node select complementary time slots for communication in the reverse direction. For example, the starting phase of a time slot in the reverse direction may be set at 2π—(starting phase of the forward time slot). The starting phase in this formula is referenced to the phase signal at the starting node, and may be calculated from the number of nodes on the communication path and the hopcount from the starting node.

The number of segments into which the communication path is divided in the second embodiment is not limited to two. The communication path may be divided into as many segments as necessary to assure that all the nodes in each segment can interact with each other, and with the last node in the preceding segment. The interaction spreads from the first segment to successively more distant segments until all nodes are involved. Interactions between nodes in adjacent segments assure that time slots are assigned in sequence from the starting node to the end node. The sequence of time slots may wrap around so that nodes that are out of interaction range with each other and cannot interfere with each other (e.g., nodes N1 and N5 in FIGS. 7A and 7B) receive identical or overlapping time slots.

The interaction request signal may be sent and received as an independent signal instead of being included in a data signal.

The present invention concerns the assignment of information for determining communication timing on a communication path that has already been selected. The method used to determine the communication timing from this information is not limited to the impulse-signal-based autonomous communication timing decision method described in the above embodiments; several variations using other types of state-variable signals are possible, as shown in the specification and drawings of Japanese Patent Application No. 2003-328530.

The present invention is applicable not only to wireless communication systems but also to wired communication systems.

Those skilled in the art will recognize that further variations are possible within the scope of invention, which is defined by the appended claims.

What is claimed is:

1. A communication time slot selecting apparatus provided in each of a plurality of nodes on a communication path from a starting node to an end node, the communication time slot selecting apparatus comprising:
    a state variable signal communication unit for intermittently transmitting, to at least one other node on the communication path, an output state variable signal indicating a rhythmic operating state or operating timing of its own node, and receiving, from the at least one other node on the communication path, an input state variable signal indicating a rhythmic operating state or operating timing of the at least one other node;
    a time slot decision unit for causing transitions in the rhythmic operating state or operating timing of its own node to occur according to a basic transition rate and the state variable signals received from the at least one other node so that the rhythmic operating state or operating timing of its own node has a rhythm that is out of phase with a rhythm of the rhythmic operating state or operating timing of the at least one other node, generating the output state variable signal by taking said transitions into account, and sending the output state variable signal to the state variable signal communication unit;
    a path setter for storing path information including at least a hopcount giving the position of its own node relative to the starting node; and
    a natural frequency setter for determining the basic transition rate according to said hopcount;
    wherein the operating state or operating timing of each node among the plurality of nodes determines time slots for collision-free data transmission.

2. The communication time slot selecting apparatus of claim 1, wherein the basic transition rate decreases as the hopcount increases.

3. The communication time slot selecting apparatus of claim 1, wherein the communication path is divided into a plurality of segments, and within each segment, the basic transition rate decreases as the hopcount increases.

4. A communication node including the communication time slot selecting apparatus of claim 1.

5. A communication system comprising a plurality of communication nodes, each communication node including the communication time slot selecting apparatus of claim 1.

6. The communication time slot selecting apparatus of claim 1, further comprising:

a steady-state decision unit for deciding whether timing relationships among the input state variable signals and the output state variable signal are in a steady state or a transitional state;

an interaction requester for generating an output interaction request signal and sending the output interaction request signal on the communication path toward the end node when the steady-state decision unit decides that the timing relationships have changed from the transitional state to the steady state, provided there is a node disposed toward the end node on the communication path that has not yet begun to transmit output state variable signals, in order to activate a time slot decision unit at the node disposed toward the end node; and means for receiving an input interaction request signal transmitted from a node closer to the starting node on the communication path and activating the time slot decision unit in response to the input interaction request signal.

7. The communication time slot selecting apparatus of claim 6, wherein the interaction requester generates and sends the output interaction request signal only if the node that has not yet begun to transmit output state variable signals is an adjacent node on the communication path.

8. The communication time slot selecting apparatus of claim 7, wherein the output interaction request signal includes hopcount information indicating the position of said node that has not yet begun to transmit output state variable signals.

9. A method of selecting time slots for collision-free data transmission on a communication path from a starting node to an end node, the communication path including at least one node between the starting node and the end node, the method comprising:

receiving, at each node from the starting node to the end node, an input state variable signal transmitted by at least one other node on the communication path, indicating a rhythmic operating state or operating timing of said at least one other node;

generating a transition in a rhythmic internal operating state or operating timing at said each node at a basic transition rate, at timings adjusted according to the input state variable signal so that the rhythmic operating state or operating timing of said each node has a rhythm that is out of phase with a rhythm of the rhythmic operating state or operating timing of the at least one other node;

generating an output state variable signal at said each node according to said transition;

transmitting the output state variable signal to said at least one other node;

storing path information at said each node indicating at least the position of the node in terms of a hopcount from the starting node; and determining the basic transition rate according to said hopcount;

wherein the operating state or operating timing of said each node determines time slots for collision-free data transmission by the node.

10. The method of claim 9, wherein the basic transition rate decreases as the hopcount increases.

11. The method of claim 9, wherein the communication path is divided into a plurality of segments, and within each segment, the basic transition rate decreases as the hopcount increases.

12. The method of claim 9, further comprising, at each node from the starting node to the end node:

deciding whether timing relationships among the input state variable signals and the output state variable signal are in a steady state or a transitional state;

generating an output interaction request signal and sending the output interaction request signal on the communication path toward the end node when the timing relationships have changed from the transitional state to the steady state, provided there is a node disposed toward the end node on the communication path that has not yet begun to transmit output state variable signals, in order to begin transmission of the output state variable signals at the node disposed toward the end node;

receiving an input interaction request signal transmitted from a noted closer to the starting node on the communication path and beginning to generate the transition and generate and output the output state variable signal in response to the input interaction request signal.

13. The method of claim 12, wherein the output interaction request signal is transmitted only if the node that has not yet begun to transmit output state variable signals is an adjacent node on the communication path.

14. The method of claim 12, wherein the output interaction request signal includes hopcount information indicating the position of said node that has not yet begun to transmit output state variable signals.

\* \* \* \* \*

UNITED STATES PATENT AND TRADEMARK OFFICE
CERTIFICATE OF CORRECTION

PATENT NO. : 7,602,803 B2  Page 1 of 1
APPLICATION NO. : 11/136448
DATED : October 13, 2009
INVENTOR(S) : Matsunaga et al.

It is certified that error appears in the above-identified patent and that said Letters Patent is hereby corrected as shown below:

On the Title Page

Item [*] Notice: Subject to any disclaimer, the term of this patent is extended or adjusted under 35 U.S.C. 154(b) by 1015 days Delete the phrase "by 1015 days" and insert -- by 712 days --

Signed and Sealed this

Seventeenth Day of August, 2010

David J. Kappos
*Director of the United States Patent and Trademark Office*